United States Patent
Ito

(10) Patent No.: US 9,704,259 B2
(45) Date of Patent: Jul. 11, 2017

(54) PEOPLE COUNTING DEVICE AND PEOPLE COUNTING METHOD

(71) Applicant: Hitachi Kokusai Electric Inc., Tokyo (JP)

(72) Inventor: Wataru Ito, Tokyo (JP)

(73) Assignee: HITACHI KOKUSAI ELECTRIC INC. (JP)

( * ) Notice: Subject to any disclaimer, the term of this patent is extended or adjusted under 35 U.S.C. 154(b) by 8 days.

(21) Appl. No.: 14/779,044

(22) PCT Filed: Mar. 14, 2014

(86) PCT No.: PCT/JP2014/056954
§ 371 (c)(1),
(2) Date: Sep. 22, 2015

(87) PCT Pub. No.: WO2014/156733
PCT Pub. Date: Oct. 2, 2014

(65) Prior Publication Data
US 2016/0055645 A1    Feb. 25, 2016

(30) Foreign Application Priority Data
Mar. 26, 2013   (JP) .................. 2013-063652

(51) Int. Cl.
G06T 7/00        (2006.01)
G06T 7/20        (2017.01)
G06K 9/00        (2006.01)

(52) U.S. Cl.
CPC ........ G06T 7/0083 (2013.01); G06K 9/00771 (2013.01); G06T 7/0095 (2013.01);
(Continued)

(58) Field of Classification Search
CPC ... G06T 7/0083; G06T 7/2033; G06T 7/0095; G06T 2207/30196; G06T 2207/10016;
(Continued)

(56) References Cited

U.S. PATENT DOCUMENTS

2003/0103647 A1   6/2003  Rui et al.
2005/0243348 A1   11/2005 Yonaha
(Continued)

FOREIGN PATENT DOCUMENTS

JP    H11-296653 A    10/1999
JP    2004-280451 A   10/2004
(Continued)

OTHER PUBLICATIONS

International Search Report.

*Primary Examiner* — Amandeep Saini
(74) *Attorney, Agent, or Firm* — Bacon & Thomas, PLLC

(57) ABSTRACT

A people counting device includes an edge extracting unit configured to extract an edge from a planar image of a target area, and a circle candidate detecting unit configured to detect a circle candidate included in the planar image based on the edge extracted by the edge extracting unit. The people counting device further includes a person determining unit configured to calculate a brightness gradient for each edge pixel constituting an edge of each circle candidate detected by the circle candidate detecting unit and determine that a circle candidate whose uniformity of brightness gradients for the edge pixels of the circle candidate is higher than a reference is a person's head portion, and a people counting unit configured to count the number of circle candidates determined to be a person's head portion by the person determining unit.

6 Claims, 6 Drawing Sheets

(52) U.S. Cl.
CPC ........ *G06T 7/2033* (2013.01); *G06K 9/00362* (2013.01); *G06T 2207/10016* (2013.01); *G06T 2207/20061* (2013.01); *G06T 2207/30196* (2013.01); *G06T 2207/30232* (2013.01); *G06T 2207/30241* (2013.01); *G06T 2207/30242* (2013.01)

(58) Field of Classification Search
CPC . G06T 2207/30241; G06T 2207/20061; G06T 2207/30232; G06T 2207/30242; G06K 9/00771; G06K 9/00362
USPC ....................................................... 382/103
See application file for complete search history.

(56) References Cited

U.S. PATENT DOCUMENTS

2006/0184274 A1    8/2006  Sakai et al.
2011/0255792 A1*  10/2011  Guo ..................... G06T 7/0046
                                                                    382/199

FOREIGN PATENT DOCUMENTS

| JP | 2005-135339 A | 5/2005 |
| JP | 2005-316978 A | 11/2005 |
| JP | 2008-204479 A | 9/2008 |
| JP | 2010-198566 A | 9/2010 |
| JP | 2012-118790 A | 6/2012 |
| JP | 2012-212968 A | 11/2012 |

\* cited by examiner

INPUT IMAGE

EDGE IMAGE

PEOPLE COUNTING DEVICE AND PEOPLE COUNTING METHOD

FIELD OF THE INVENTION

The present invention relates to a people counting device for counting the number of persons present in a target area.

BACKGROUND OF THE INVENTION

A conventional people counting device counts the number of persons in a target area by detecting the presence of persons by means of an infrared sensor or the like and incrementing a counter provided in the device if any persons are present.

In addition, the people counting device processes an image (input image) obtained by capturing a target area by means of an imaging device mounting an solid-state imaging element such as a CCD (Charge Coupled Device) or a CMOS (Complementary Metal-Oxide Semiconductor), automatically detects an object in the input image, measures how many persons are present based on attribute information such as positions or movement paths of the object, and counts the number of persons in the target area by incrementing the counter provided in the device.

As one example, Patent Document 1 discloses a people counting device wherein a head model according to its head size (the ratio of the edge with respect to the size of the head model) expected in each portion of an image obtained when a person is imaged is set while shifting the position of the head model, a person's head portion included in the image is extracted based on the set head model, head portions extracted among a plurality of images included in a video are associated with each other, and the number of persons included in the video meeting predetermined conditions (time and area) is counted based on the number of trajectories of the associated head portions.

RELATED ART DOCUMENT

Patent Document

Patent Document 1: Japanese Patent Laid-open Publication No. 2010-198566

SUMMARY OF THE INVENTION

In the above-described people counting device, for example, if the device is of an infrared sensor type, since it cannot recognize movement directions of persons, it cannot count the number of persons moving in a particular direction. If the device is of an image processing type, it cannot correctly count the number of persons when two or more persons overlap with each other in the field of view.

In view of such circumstances, it is an object of the present invention to provide a technique capable of correctly counting the number of persons included in an image.

In order to accomplish the above object, the present invention provides the following people counting device. The people counting device includes an edge extracting unit configured to extract an edge from a planar image of a target area, a circle candidate detecting unit configured to detect a circle candidate included in the planar image based on the edge extracted by the edge extracting unit, a person determining unit configured to calculate a brightness gradient for each of a plurality of edge pixels constituting an edge of each circle candidate detected by the circle candidate detecting unit and determine that a circle candidate whose uniformity of brightness gradients for the edge pixels of the circle candidate is higher than a reference is a person's head portion, and a people counting unit configured to count the number of circle candidates determined to be a person's head portion by the person determining unit.

With this configuration, for the circle candidate included in the planar image of the target area, it is possible to effectively determine whether or not circle candidate has a circular likeness such as a person's head, from the uniformity of brightness gradients for the edge pixels constituting the edge of the circle candidate, thereby making it possible to correctly count the number of persons included in the planar image.

As one example, the person determining unit may calculate a degree of radial distribution of brightness gradients for each edge pixel from the center of the circle, as an indicator indicating the uniformity of brightness gradients for the edge pixels constituting the edge of the circle candidate, and determine whether or not the uniformity of brightness gradients for the edge pixels constituting the edge of the circle candidate is higher than the reference by comparing the result of the calculation with a predetermined threshold. This is to focus on the direction of brightness gradients for each of the edge pixels constituting the edge of the circle candidate and determine a circle candidate having a high radial distribution of brightness gradients for the edge pixels (circle candidate having a nigh circular likeness such as a head portion), as a person's head portion.

As another example, the person determining unit may calculate a degree of variation of magnitude of brightness gradients for each edge pixel, as an indicator indicating the uniformity of brightness gradients for the edge pixels constituting the edge of the circle candidate, and determine whether or not the uniformity of brightness gradients for the edge pixels constituting the edge of the circle candidate is higher than the reference by comparing the result of the calculation with a predetermined threshold. This is to focus on the magnitude of brightness gradient for each of the edge pixels constituting the edge of the circle candidate and determine a circle candidate having a low variation of magnitude of brightness gradients for the edge pixels (circle candidate having a high circular likeness such as a head portion), as a person's head portion.

According to the present invention, for a circle candidate included in a planar image of a target area, it is possible to effectively determine whether or not the circle candidate has a circular likeness such as a person's head portion, from the uniformity of brightness gradients for edge pixels constituting the edge of the circle candidate, thereby making it possible to correctly count the number of persons included in the planar image.

DETAILED DESCRIPTION OF THE EMBODIMENTS

One embodiment of the present invention will now be described with reference to the accompanying drawings.

Figure 1:
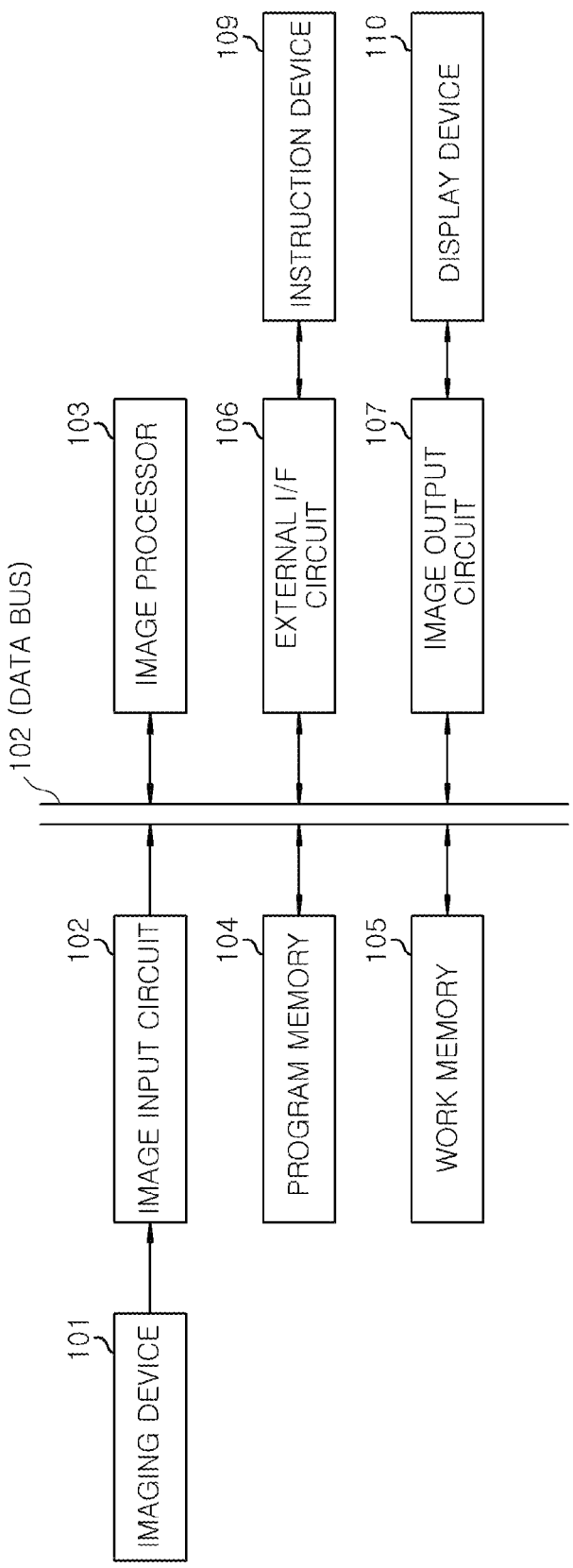
FIG. 1 is a view showing an example configuration of a monitor to which a people counting device according to the present invention is applied.

FIG. 1 is a view showing an example configuration of a monitor to which a people counting device according to the present invention is applied. The monitor in this example includes an imaging device 101, an image input circuit 102, an image processor 103, a program memory 104, a work memory 105, an external I/F circuit 106, an image output circuit 107, a data bus 108, an instruction device 109 and a display device 110.

The image input circuit 102, the image processor 103, the program memory 104, the work memory 105, the external I/F circuit 106 and the image output circuit 107 are connected to the data bus 108.

The imaging device may include elements such as a device for controlling the imaging device, various external recording devices, and the like, in addition to the configuration of this example, but these elements are omitted in this example for the sake of simplification of description.

The imaging device 101 captures an image of an area to be monitored. The image captured by the imaging device 101 is supplied to the image input circuit 102 and is stored into the work memory 105 via the image input circuit 102. In this example, the image of the monitored area is captured at the viewpoint overlooking the monitored area vertically from above.

The image processor 103 processes the image stored in the work memory 105 by a program stored in the program memory 104 and display a result of the processing on the display device 110 via the image output circuit 107. The image processor 103 processes the image while changing or modifying parameters of the program, based on instructions which are input via the external I/F circuit 106 by an operator using the instruction device 109 such as a mouse, a keyboard or the like. The image processor 103 performs a people counting process of counting the number of persons included in the image.

Figure 2:
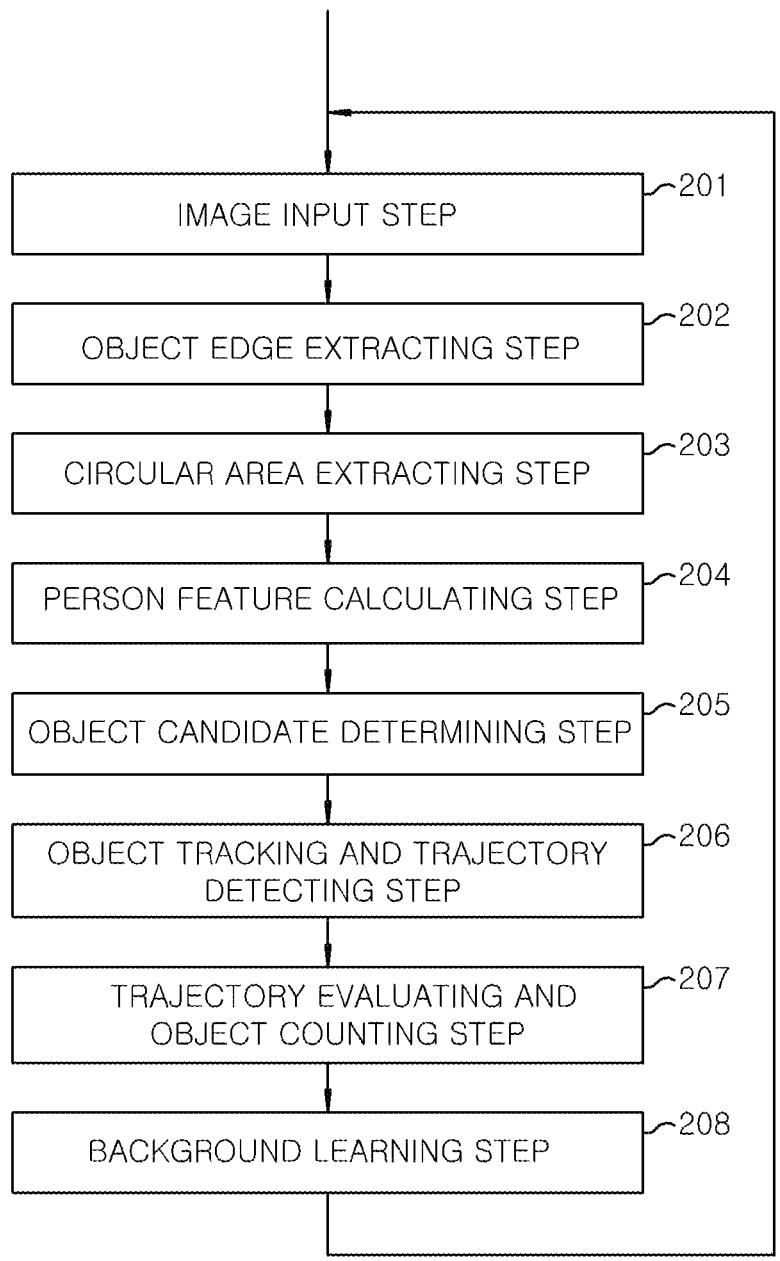
FIG. 2 is a flow chart showing a people counting process according to the present invention.
Figure 3A:
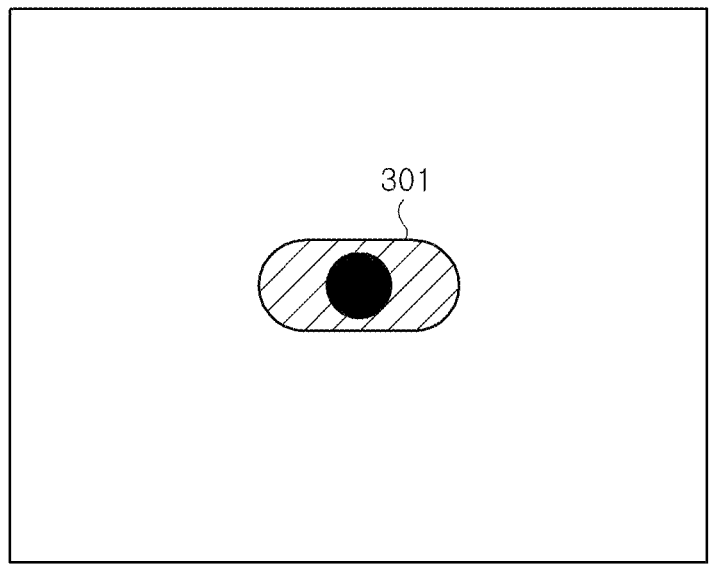
FIG. 3A is a view showing an input image example and FIG. 3B is a view showing an edge image example.

FIG. 2 is a flow chart showing a people counting process performed by the monitor of this example. Here, paying attention to the fact that a person's head portion in a planar image obtained by imaging a person vertically from above has a circular contour, as shown in FIG. 3A, the number of persons included in the image is counted in the people counting process of this example by finding and processing an area having a circular contour from the image.

The people counting process of this example includes an image input step 201, an object edge extracting step 202, a circular area extracting step 203, a person feature calculating step 204, an object candidate determining step 205, an object tracking and trajectory detecting step 206, a trajectory evaluating and object counting step 207 and a background learning step 208, which are repeated in this order.

In the image input step 201, one frame image in a video of the monitored area captured by the imaging device 101 is received and taken as an input image of a target to be processed. FIG. 3A shows an example of the input image obtained when one person 303 is imaged vertically from above.

Figure 3B:
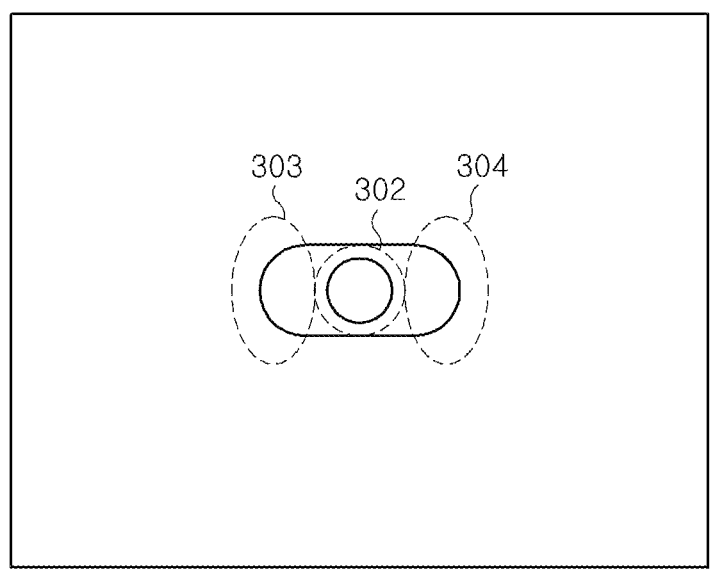

In the object edge extracting step 202, an object edge included in the input image is extracted and an edge image is generated. FIG. 3B shows an example of the edge image generated from the input image of FIG. 3A. The edge image includes edge pixels having predetermined values which represent edge and non-edge pixels having values different from the predetermined values.

In the circular area extracting step 203, an area having a circular edge shape (contour) is identified and extracted as a circle candidate from the edge image generated in the object edge extracting step 202.

In this example, the generalized Hough transformation technique known in the art is used to identify an area having a circular edge shape, as will be described below.

Figure 4A:
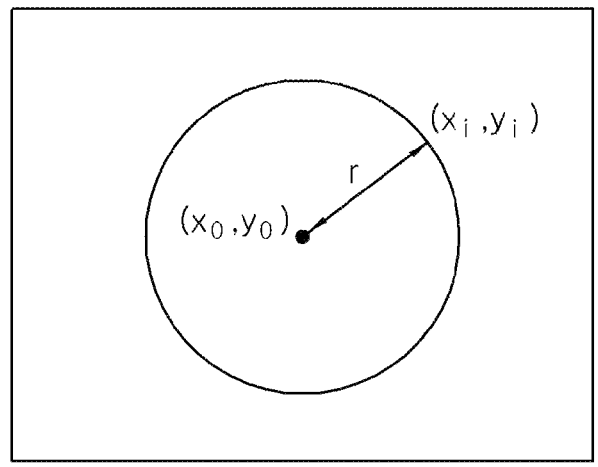
FIG. 4A shows an example of a circle passing an $i^{th}$ edge pixel (xi, yi)
Figure 4B:
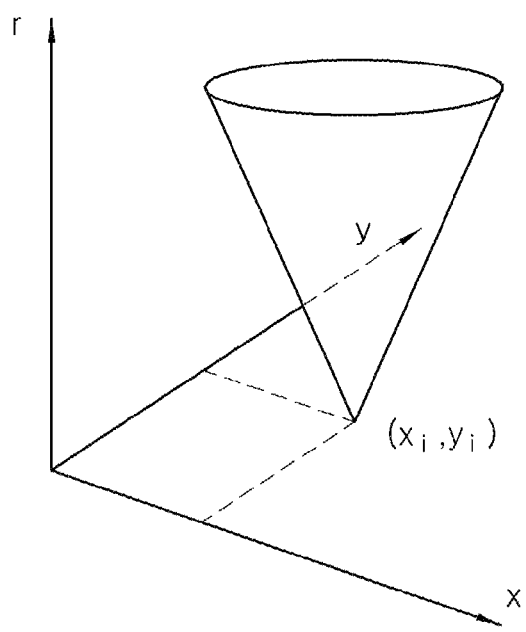
FIG. 4B shows an example of a distribution in three dimensional Hough space of circles passing the $i^{th}$ edge pixel (xi, yi).

Specifically, among N number of edge pixels included in the edge image, assuming a circle passing any $i^{th}$ (i being an integer of 1 to N) edge pixel (xi, yi) (a circle having the point (xi, yi) on its circumference), this circle can be represented by three parameters including a center coordinate (x0, y0) and a radius r, as shown in FIG. 4A. It may be here assumed that the number of circles passing any $i^{th}$ edge pixel (xi, yi) is innumerable. When expressed using a three-dimensional Hough space consisting of three parameters x, y and r, a distribution of parameters of the circle passing the edge pixel (xi, yi) is as shown in FIG. 4B. By examining a distribution of parameters of circles assumed to pass all edge pixels (points) included in the edge image and identifying parameters on which the distribution is concentrated, it is possible to detect an area (circle candidate) having a circular edge shape.

Specifically, for example, a parameter array h[x][y][r] representing coordinates on the three-dimensional Hough space is prepared and all values of the coordinates are initialized to 0. Then, for all edge pixels included in the edge image, parameter arrays h[x][y][r], corresponding to parameters x, y and r of all circles which may pass the edge pixel, are added (voted) one by one. After finishing the voting for all edge pixels, by selecting a predetermined number of (for example, 10 or less) parameter arrays h[x][y][r] in the order of increase in their values (i.e., in the order of increase in the number of votes), it is possible to detect an area (circle candidate) having a circular edge shape.

For example, for the edge image shown in FIG. 3B, since each of areas of a person's head portion 302, left shoulder portion 303 and right shoulder portion 304 has, partially or entirely, a circular edge shape, each of these three areas is detected as a circle candidate.

In the person feature calculating step 204, a person feature for each circle candidate extracted in the circular area extracting step 203 is calculated. This person feature is an indicator indicating the degree of a person's head likeness of a circle candidate (the area having a circular edge shape).

In this example, for any edge pixel (xi, yi) at an edge of a circle candidate for which a person feature is calculated, an X-direction component dxi and a Y-direction component dyi of a brightness gradient between adjacent pixels in an input image are calculated. Here, as the X-direction component dxi of the brightness gradient for the edge pixel (xi, yi), a brightness difference between the previous pixel (xi−1, yi)

and the next pixel (xi+1, yi) in the X-direction may be used. As the Y-direction component dyi of the brightness gradient for the edge pixel (xi, yi), a brightness difference between the previous pixel (xi, yi−1) and the next pixel (xi, yi+1) in the Y-direction may be used. The uniformity S of brightness gradient for edge pixels constituting the edge of the circle candidate is obtained from the X-direction component dxi and the Y-direction component dyi of the brightness gradient calculated for the edge pixels and is assumed as a person feature of the circle candidate.

The uniformity S of brightness gradient for edge pixels constituting the edge of the circle candidate may represent an index indicating whether or not brightness gradients for the edge pixels are in the same direction when viewed from the circle center, in other words, whether or not the brightness gradients for the edge pixels are distributed radially from the circle center.

In this case, for example, an angle φi indicating the direction of each edge pixel (xi, yi) viewed from the circle center (x0, y0) is calculated according to Equation 1, an angle θi indicating the direction of brightness gradient at each edge pixel (xi, yi) is calculated according to Equation 2, and a score S1 summing absolute values of differences between these angles φi and θi is calculated according to Equation 3. This calculated score S1 may be used as a person feature.

$$\phi_i = \tan^{-1} \frac{y_i - y_0}{x_i - x_0} \quad \text{[Equation 1]}$$

$$\theta_i = \tan^{-1} \frac{dy_i}{dx_i} \quad \text{[Equation 2]}$$

$$S_1 = \sum_i |\theta_i - \phi_j| \quad \text{[Equation 3]}$$

A smaller value of the score S1 calculated in this manner indicates a higher degree of radial distribution of brightness gradients for edge pixels constituting an edge of the circle candidate from the circle center and higher uniformity of the brightness gradients. Therefore, the higher score S1 provides a higher circle likeness (person's head likeness).

In the object candidate determining step 205, it is determined whether or not the circle candidate extracted in the circular area extracting step 203 is a person's head portion, based on the person feature calculated in the person feature calculating step 204.

In this example, since the score S1 is calculated as the person feature in the person feature calculating step 204 and the higher score S1 provides a higher circle likeness (person's head likeness), if the score S1 calculated for any circle candidate is equal to or smaller than a predetermined threshold T1, it is determined that the uniformity of brightness gradients for edge pixels constituting the circle candidate is higher than a reference, i.e., the circle candidate is the person's head portion.

Figure 5A:
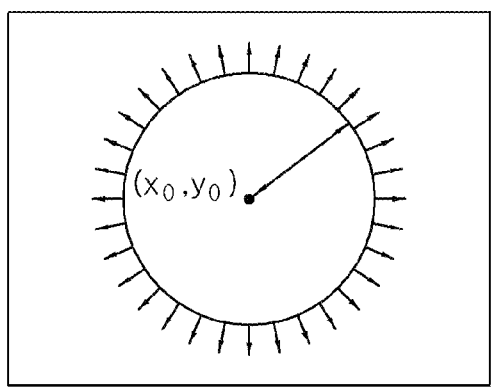
FIG. 5A shows an example of a circle candidate having a high radial distribution of brightness gradients for each edge pixel from the center of the circle and FIG. 5B shows an example of a circle candidate having a low radial distribution of brightness gradients.
Figure 5B:
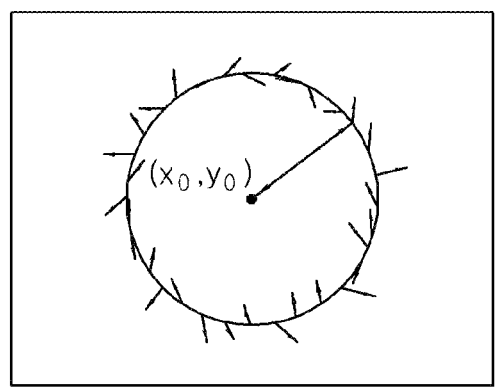

For example, as shown in FIG. 5A, if the radial distribution of brightness gradients for edge pixels is high, the value of the score S1 is small, thereby determining that the circle candidate is a person's head portion. On the other hand, as shown in FIG. 5B, if the radial distribution of brightness gradients for edge pixels is low, the value of the score S1 is large, thereby determining that the circle candidate is not a person's head portion.

For example, for the edge image shown in FIG. 3B, among the three areas 302, 303 and 304 detected as circle candidates, the area 302 is determined to be a person's head portion since it has a high circle likeness (a small value of the score S1) but the areas 303 and 304 are determined not to be a person's head portion since they have a low circle likeness (a large value of the score S1).

In addition, in the people counting process of this example, a back ground image obtained by removing a moving object from the input image is prepared, and circle candidates (areas having a circular edge shape) are extracted by subjecting this background area to the object edge extracting step 202 and the circular area extracting step 203. The object candidate determining step 205 is performed excluding the circle candidate extracted from the background image. That is, the circle candidates extracted from the background image are regarded as background elements (such as a floor pattern) and are not determined to be a person's head portion even if it has a very high circular likeness.

In the object tracking and trajectory detecting step 206, based on the circle candidate determined to be the person's head portion in the past input image and the circle candidate determined to be the person's head portion in the current input image, movement of the person (the circular edge area) is tracked and its trajectory is detected.

In the Trajectory evaluating and object counting step 207, the number of persons included in the input image is counted by evaluating the movement trajectories detected in the object tracking and trajectory detecting step 206. In this example, the number of trajectories is counted and assumed as the number of persons.

In the background learning step 208, the current input image is used to update the background image. Specifically, an image obtained by multiplying the current input image with a predetermined coefficient α and an image obtained by multiplying the current background image with (1−α) are synthesized (added), and the resultant image is used for the next background image. Thus, the latest background image without an object (person or the like) in the input image can be obtained.

As described above, the people counting process of this example includes a process of receiving a planar image obtained by imaging a monitored area from above (image input step 201), a process of extracting an edge from the planar image (object edge extracting step 202), a process of detecting a circle candidate (an area having a circular edge shape) included in the planar image based on the extracted edge (circular area extracting step 203), a process of calculating brightness gradients for edge pixels constituting an edge of each detected circle candidate and calculating an indicator indicating the uniformity of brightness gradients for the edge pixels of each circle candidate (person feature calculating step 204), a process of determining whether or not the circle candidate is a person's head portion by comparing the calculated indicator with a predetermined threshold (object candidate determining step 205), a process of counting the number of persons included in a planar image based on the circle candidate determined to be the person's head portion (object tracking and trajectory detecting step 206 and trajectory evaluating and object counting step 207), and a process of updating a background image used for exception of a background element included in the planar image (background learning step 208).

According to this people counting process, for a circle candidate included in a planar image of a monitored area, it can be determined from the uniformity of brightness gradient for each of edge pixels constituting an edge of the circle candidate whether or not the circle candidate has a circular likeness such as a person's head portion, thereby correctly counting the number of persons included in the planar image.

In addition, the above-described steps (201 to 208) may be performed for each frame image or a predetermined number of frame images in a video of the monitored area captured by the imaging device 101. In addition, although, in the above example, the number of movement trajectories detected in the object tracking and trajectory detecting step 206 is counted and assumed as the number of persons in order to increase the accuracy of the counting of the number of persons included in the planar image of the monitored area, the number of circular edge areas determined to be person's head portions in the object candidate determining step 205 may be counted and assumed as the number of persons.

In addition, although, in the above example, an index indicating a degree of radial distribution of brightness gradients for each of edge pixels constituting an edge of the circle candidate from the circle center is calculated as a person feature of the circle candidate in the person feature calculating step 204, a different index may be calculated as a person feature.

As one example, a case of calculating an index indicating a degree of magnitude variation of brightness gradient for each of edge pixels constituting an edge of the circle candidate, as a person feature, will be described.

In this case, for example, for any edge pixel (xi, yi) at an edge of a circle candidate for which a person feature is calculated, an X-direction component dxi and a Y-direction component dyi of a brightness gradient between adjacent pixels in an input image are calculated. Here, as the X-direction component dxi of the brightness gradient for the edge pixel (xi, yi), a brightness difference between the previous pixel (xi−1, yi) and the next pixel (xi+1, yi) in the X-direction may be used. As the Y-direction component dyi of the brightness gradient for the edge pixel (xi, yi), a brightness difference between the previous pixel (xi, yi−1) and the next pixel (xi, yi+1) in the Y-direction may be used.

These components are used to calculate the magnitude of brightness gradient for the edge pixel (xi, yi) according to Equation 4. For a plurality of fan-shaped areas into which a circle candidate area is divided by a predetermined angle, the magnitudes of brightness gradients for edge pixels in each fan-shaped area are summed. Here, assuming that the number of divisions of the circle candidate area (the number of fan-shaped areas) is M, the sum gj of the magnitudes of brightness gradients for an edge image in any $j^{th}$ fan-shaped area (j is an integer of 1 to M) is calculated. In addition, assuming that the total sum of the magnitude of brightness gradients for edge pixels constituting an edge of the circle candidate is n, a score S2 indicating an entropy for the total number gj calculated for each fan-shaped area is calculated according to Equation 5 and the calculated score S2 may be used as a person feature of the circle candidate.

$$d_i = \sqrt{dx_i^2 + dy_i^2} \qquad \text{[Equation 4]}$$

$$S_2 = -\sum_{j=1}^{M} \frac{g_j}{n} \log \frac{g_j}{n} \qquad \text{[Equation 5]}$$

A smaller value of the score S2 calculated as above indicates a lower variation of the magnitude of brightness gradient for edge pixels constituting an edge of the circle candidate and higher uniformity of the brightness gradient. Therefore, the smaller score S2 provides a higher circular likeness (person's head likeness). Accordingly, in the subsequent object candidate determining step 205, if the score S2 calculated for any circle candidate is equal to or smaller than a predetermined threshold T2, it may be determined that the uniformity of brightness gradients for edge pixels constituting the circle candidate is higher than a reference, i.e., the circle candidate is the person's head portion.

Figure 6A:
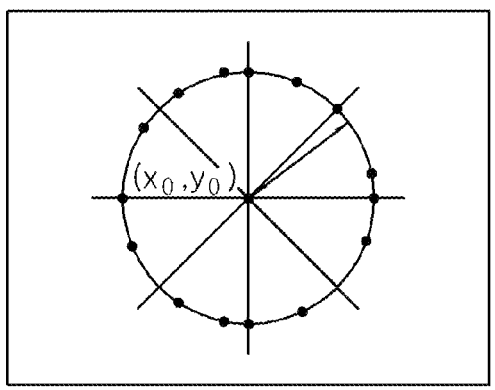
FIG. 6A shows an example of a circle candidate having a low variation of magnitude of brightness gradients for each edge pixel and FIG. 6B shows an example of a circle candidate having a high variation of magnitude of brightness gradients.
Figure 6B:
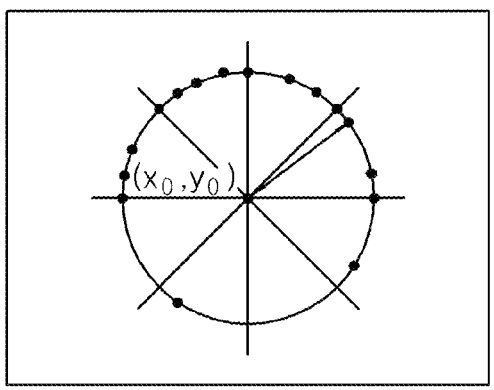

FIGS. 6A and 6B show an example where a circle candidate area is divided into eight (M=8) fan-shaped areas.

For example, as shown in FIG. 6A, if a degree of variation of magnitude of brightness gradients for edge pixels constituting an edge of the circle candidate is low, the value of the score S2 is small, thereby determining that the circle candidate is a person's head portion. On the other hand, as shown in FIG. 6B, if a degree of variation of magnitude of brightness gradients for edge pixels constituting an edge of the circle candidate is high, the value of the score S2 is large, thereby determining that the circle candidate is not a person's head portion.

The score S1, which is an indicator for direction of brightness gradient for edge pixels constituting an edge of the circle candidate, and the score S2, which is an indicator for magnitude of brightness gradient for edge pixels constituting an edge of the circle candidate, are calculated and, if one of the scores S1 and S2 is smaller than the corresponding threshold T1 or T2, the circle candidate may be determined to be a person's head portion. Or, if both of the scores S1 and S2 are smaller than the corresponding thresholds T1 and T2, the circle candidate may be determined to be a person's head portion. Alternatively, through comparison of a score S1,2, which is obtained by multiplying and adding the scores S1 and S2 with predetermined weights β1 and β2, respectively, with a predetermined threshold T1,2, it may be determined whether or not the circle candidate is a person's head portion.

In the monitor used in the above description, a process of the edge extracting unit of the present invention is implemented by the object edge extracting step 202, a process of the circle candidate detecting unit of the present invention is implemented by the circular area extracting step 203, a process of the person determining unit of the present invention is implemented by the person feature calculating step 204 and the object candidate determining step 205, and a process of the people counting unit of the present invention is implemented by the object tracking and trajectory detecting step 206 and the trajectory evaluating and object counting step 207.

The configuration of the system or apparatus of the present invention is not necessarily limited to those shown in the above but may be modified in different ways.

Figure 7:
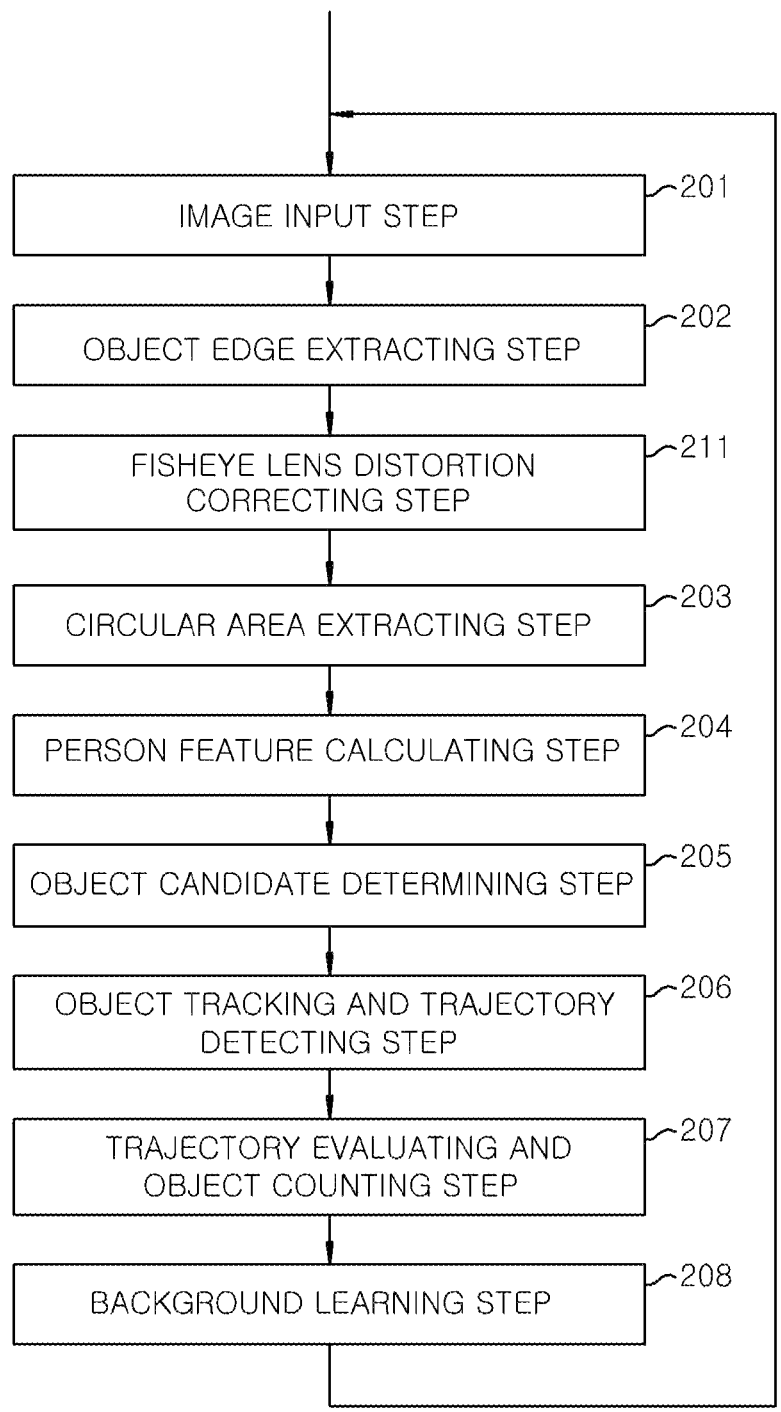
FIG. 7 is another flow chart of the people counting process according to the present invention.

As another configuration, FIG. 7 shows a flow chart of a people counting process using a fisheye lens as a lens of the imaging device 101. Here, although the fisheye lens may be used to capture an image with a wider viewing angle, since a distortion becomes larger as it becomes far away from the center of the image, a person's head portion, which would be inherently close to a circular shape, is imaged in a distorted state in the vicinity of an edge of the image, which has an adverse effect on extraction of the circle candidate in the circular area extracting step 203.

Therefore, in the example of FIG. 7, a fisheye lens distortion correcting step 211 of performing fisheye correction to add a distortion, which is opposite to the distortion by the fisheye lens, to the edge image prior to the circular area extracting step 203. This allows a circle candidate to be detected from the edge image with correction (reduction) of the distortion by the fisheye lens. As a result, since a circle (person's head portion) candidate can be suitably detected from a wide angle image, it is possible to set a wide range of monitored area and correctly count the number of persons included in the monitored area.

In addition, although, in the example of FIG. 7, the fisheye correcting step 211 is placed after the object edge extracting step 202 and the edge image generated in the object edge extracting step 202 is subjected to the fisheye correction. However, the fisheye lens distortion correcting step 211 may be placed after the image input step 201, the input image received in the image input step 201 may be subjected to the fisheye correction, and the edge image may be generated from a resultant image in the object edge extracting step 202.

Here, the present invention can be implemented with a method or system of performing a process of the present invention, a program for realizing the method or system, or a storage medium storing the program.

The people counting device (or method or program, or the like) according to the present invention can be applied to various scenes for counting the number of persons included in a target area.

REFERENCE NUMERALS

101: Imaging device
102: Image input circuit
103: Image processor
104: Program memory
105: Work memory
106: External I/F circuit
107: Image output circuit
108: Data bus
109: Instruction device
110: Display device
201: Image input step
202: Object edge extracting step
203: Circular area extracting step
204: Person feature calculating step
205: Object candidate determining step
206: Object tracking and trajectory detecting step
207: Trajectory evaluating and object counting step
208: Background learning step
211: Fisheye lens distortion correcting step

What is claimed is:

1. A people counting device comprising:
an edge extracting unit configured to extract an edge from a planar image of a target area;
a circle candidate detecting unit configured to detect a circle candidate included in the planar image based on the edge extracted by the edge extracting unit;
a person determining unit configured to calculate a brightness gradient for each of a plurality of edge pixels constituting an edge of each circle candidate detected by the circle candidate detecting unit and determine that a circle candidate whose uniformity of brightness gradients for the edge pixels of the circle candidate is higher than a reference is a person's head portion; and
a people counting unit configured to count a number of circle candidates determined to be a person's head portion by the person determining unit.

2. The people counting device of claim 1, wherein the person determining unit calculates a degree of radial distribution of brightness gradients for each edge pixel from a center of the circle, as an indicator indicating the uniformity of brightness gradients for the edge pixels constituting the edge of the circle candidate, and determines whether or not the uniformity of brightness gradients for the edge pixels constituting the edge of the circle candidate is higher than the reference by comparing a result of the calculation with a predetermined threshold.

3. The people counting device of claim 1, wherein the person determining unit calculates a degree of variation of magnitude of brightness gradients for each edge pixel, as an indicator indicating the uniformity of brightness gradients for the edge pixels constituting the edge of the circle candidate, and determines whether or not the uniformity of brightness gradients for the edge pixels constituting the edge of the circle candidate is higher than the reference by comparing a result of the calculation with a predetermined threshold.

4. A people counting method comprising:
extracting an edge from a planar image of a target area;
detecting a circle candidate included in the planar image based on the edge extracted by extracting the edge;
calculating a brightness gradient for each of a plurality of edge pixels constituting an edge of each circle candidate detected by detecting the circle candidate and determining that a circle candidate whose uniformity of brightness gradients for the edge pixels of the circle candidate is higher than a reference is a person's head portion; and
counting a number of circle candidates determined to be a person's head portion by the determining.

5. The people counting method of claim 4, wherein the determining comprises calculating a degree of radial distribution of brightness gradients for each edge pixel from a center of the circle, as an indicator indicating the uniformity of brightness gradients for the edge pixels constituting the edge of the circle candidate, and determining whether or not the uniformity of brightness gradients for the edge pixels constituting the edge of the circle candidate is higher than the reference by comparing a result of the calculation with a predetermined threshold.

6. The people counting method of claim 4, wherein the determining comprises calculating a degree of variation of magnitude of brightness gradients for each edge pixel, as an indicator indicating the uniformity of brightness gradients for the edge pixels constituting the edge of the circle candidate, and determining whether or not the uniformity of brightness gradients for the edge pixels constituting the edge of the circle candidate is higher than the reference by comparing a result of the calculation with a predetermined threshold.

* * * * *